Patented Aug. 1, 1944

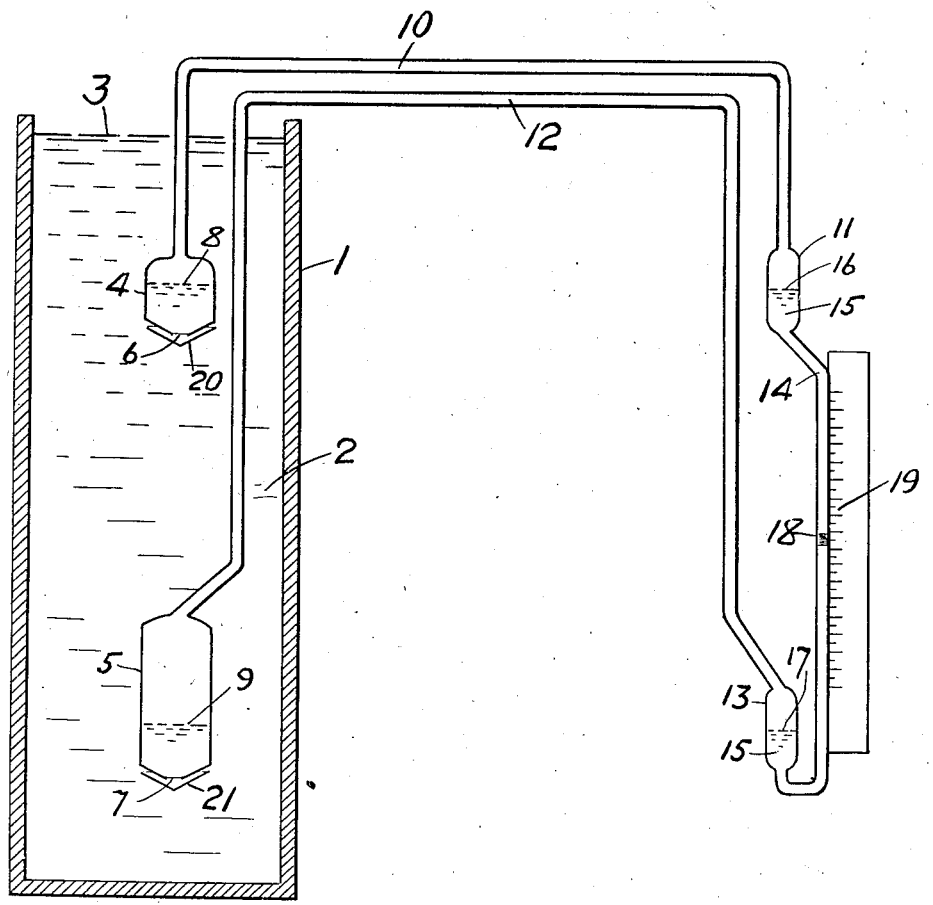

2,354,847

UNITED STATES PATENT OFFICE 2,354,847

REMOTE-READING SPECIFIC-GRAVITY INDICATOR

Joseph Lester Woodbridge, Philadelphia, Pa., assignor to The Electric Storage Battery Company, Philadelphia, Pa., a corporation of New Jersey Application October 25, 1940, Serial No. 362,769

3 Claims. (Cl. 265—44)

The apparatus is designed to indicate the specific gravity of a liquid in a suitable container at a point at some distance from the container. It consists generally in two inverted cup-shaped vessels or air bells located one above the other in the vessel and submerged in the liquid whose specific gravity is to be measured. These cups are open below to provide access to the liquid which rises to a certain level in the cups, the space above that level being filled with gas whose pressure is transmitted by suitable small bore tubing to the indicating apparatus. This indicating apparatus consists in two corresponding receptacles, or bulbs, one above the other, connected at the lower ends by a straight tube of comparatively small bore and at their upper ends to the tubing from the corresponding cups in the vessel. The receptacles in the indicating apparatus are partially filled with a suitable liquid which also fills the small bore tubing connected to their lower ends. This latter tubing is transparent, and intermediate of its length there is a short section of liquid of a different color from and nonmiscible with the liquid which fills the balance of the tube and whose position in the tube is indicated on an indicating scale adjacent to the tube. Variations in the specific gravity of the liquid in the vessel will introduce changes in the gas pressure in the connecting tubing, causing liquid to be transferred from the lower bulb through the indicating tubing to the upper bulb or vice versa, this transfer being indicated by a shifting of the colored section of liquid in the connecting tube.

The invention will be more clearly understood by reference to the accompanying drawing in which the single figure is a diagrammatic view illustrating features of the invention.

Referring to the drawing, 1 is the vessel containing the liquid 2, whose specific gravity is to be indicated. The upper level of the liquid is shown at 3. Immersed in the liquid are two inverted cup-shaped receptacles or air bells 4 and 5 one located directly above the other and provided at the bottom with openings 6 and 7, respectively, affording access from the liquid to the interior of the cup. This liquid will rise in the cups to the level indicated by the lines 8 and 9, respectively, being prevented from rising further by the presence of the gas or air in the space above. The cup 4 is connected by means of the pressure tube 10 to the upper end of the bulb 11 of the pressure-indicating apparatus while the cup 5 is connected by means of the pressure tube 12 with the upper end of the bulb 13 of the pressure-indicating apparatus. The lower end of the bulb 11 is connected with the lower end of the bulb 13 by the straight small bore indicating tube or column 14, and this tube together with the lower portions of the bulbs 11 and 13 is filled with a liquid 15 which rises in the two bulbs to the levels indicated by the lines 16 and 17, respectively. The upper portions of the cups 4 and 5 and the upper portions of the bulbs 11 and 13 together with the pressure tubes 10 and 12 are filled with a gas such as air which may be slightly above normal atmospheric pressure.

At an intermediate point in the indicating tube 14 is a small section of liquid 18 of a different color from that of the balance of the liquid so that its position in the tube can be clearly seen, the tube being transparent. This liquid 18 is preferably of about the same specific gravity as the balance of the liquid in the tube and is nonmiscible with it.

If the specific gravity of the liquid 15 in the indicating tube and bulbs is the same as that of the liquid 2 in the vessel 1, equilibrium will be established when the difference in head between the level 16 in the bulb 11 and the level 17 in the bulb 13 is the same as the difference in head between the level 8 in the cup 4 and the level 9 in cup 5.

If now the specific gravity of the liquid 2 in vessel 1 should, for example, increase, this equilibrium will be disturbed and, in order to reestablish equilibrium, the head between the level 16 and the level 17 must be increased so that the weight of the column of the liquid 15 corresponding to the new distance between levels 16 and 17 will be equal to the weight of a corresponding column of liquid between the levels 8 and 9 at the increased specific gravity. To reestablish this equilibrium, liquid will be forced down from the vessel 13 and up through the tube 14 into the vessel 11. This transfer will move the indicator 18 upward in the tube to a new position as indicated by an appropriate scale 19 adjacent to the tube. The change in the levels 16 and 17 may be comparatively small but this will be magnified in the proportion between the area of the bore of the tube 14 and the cross-sectional area of the bulbs 11 and 13 so that an accurate reading of the change in specific gravity of the liquid may be obtained.

This apparatus may be employed in various applications for reading the specific gravity of liquids and would be particularly useful for reading the specific gravity of the electrolyte in a storage battery cell. For such an application, the inverted conical baffles 20 and 21 are shown located beneath the cups 4 and 5, respectively, to divert the bubbles of gas which are frequently evolved in the cell and prevent them from entering the cups and thus changing the volume of gas in the cups, pressure tubes and bulbs.

In order to more clearly illustrate the performance of this apparatus, a numerical example will now be given covering the application to the cell of a storage battery. It will be assumed that the specific gravity of the electrolyte in the cell may vary from 1.100 to 1.250, resulting in a range of ±0.075 on either side of the mean value of 1.175.

The vertical distance between the levels 8 and 9 in the cups 4 and 5 is taken as 6" when the specific gravity of the liquid is at the mean value of 1.175. The internal diameter of the cylindrical cups 4 and 5 is 1". The diameter of the bore of the pressure tubes 10 and 12 is 0.04" and the length of the horizontal portions of these tubes is approximately 10 feet. The internal diameter of the bulbs 11 and 13 is 0.35" and the height of these bulbs is 1.0". The bore of the indicating tube 14 is 0.1". Assuming the specific gravity of the liquid 15 in the bulbs and indicating tube to be 1.175, the equilibrium will be established as indicated in the figure when the distance between the levels 8 and 9 is equal to the distance between the levels 16 and 17, that is 6".

Assume now that the specific gravity of the liquid 2 increases to 1.250. The weight of the 6" column of liquid between the levels 8 and 9 will be increased in the ratio of 1.175 to 1.250, that is 1.0638. To balance this increase of head, the head in the indicating column and bulbs must be increased in the same ratio, that is from 6" to 6.3828", i. e., the level in the lower bulb 13 must be reduced by 0.1914" and that in the upper bulb 11 must be raised by the same amount. The volume of liquid thus transferred from the lower to the upper bulb through the indicating tube 14 will be 0.1914 multiplied by the area of the internal cross-section of the bulb, which is $(0.35)^2 \times 0.7854$, or 0.0184 cubic inches. This transfer will cause the indicator 18 to travel a distance equal to this volume divided by the area of the bore of the tube, i. e., 0.0184/0.007854 or 2.34". The full length of the scale 19 will then be 4.68" to cover the complete range from 1.100 to 1.250 specific gravity. This will provide a sufficiently open scale for accurate readings.

The apparatus as above described will give accurate readings of the specific gravity of the electrolyte provided the temperature and the level 3 remain constant. The effect of changes of level of the electrolyte within the usual limits in practice will not appreciably affect the readings indicated by this apparatus.

In regard to temperature, it is usually desirable that the indication of specific gravity be automatically corrected for variations of temperature. The apparatus disclosed herein provides this automatic temperature correction by including a greater volume of gas in the cup 5 above the level 9 than that in the cup 4 above the level 8. Thus, if the temperature should increase, the volume of gas in these cups will increase but this increase in the cup 5 will be greater than that in the cup 4, thus increasing the head between the level 8 and the level 9. This difference in volume of gas can be made such that the increase in head will counteract the decrease in specific gravity due to the increase in temperature of the electrolyte.

To illustrate this in the numerical example, assume a change in temperature from 25° C. to 60° C. This will reduce the actual specific gravity from 1.175 to 1.154. To compensate for this, the head between level 8 and level 9 must be increased in the same ratio, from 6" to 6.11". This change of temperature will increase the volume of gas in each cup by $$\frac{35}{298} = .117$$

and, since the two cups have the same diameter, the volume will vary as the height of the gas space. Hence, representing these heights by $h_4$ and $h_5$ respectively we have $$h_5 \times 0.117 - h_4 \times 0.117 = 0.11$$

from which $$h_5 - h_4 = \frac{0.11}{0.117} = 0.94''$$

and the height of the gas space in cup 5 should be 0.94" more than that in cup 4.

It will be understood that modifications in the details of the apparatus may be made without departing from the spirit of the invention. The specific gravity of the liquid in the indicating tube and bulbs need not be the same as that in the vessel 1 provided the distance between the levels 16 and 17 is correspondingly changed. If, in the case of the storage battery cell, the baffles 20 and 21 are omitted, the cups 4 and 5 will fill with gas, bringing the levels 8 and 9 down to the lower rims of the cups which will eliminate the provision for temperature correction.

While I have shown the cups 4 and 5 and the bulbs 11 and 13 located in the same vertical line, one above the other, this arrangement would not be necessary if the apparatus is so installed that there will be no tilting through a vertical angle.

If the apparatus is assembled as shown in the drawing with the cups 4 and 5 and the bulbs 11 and 13 vertically aligned, a considerable amount of tilting can take place without seriously affecting the accuracy of the indication if both parts of the apparatus always tilt by the same amount as would be the case if the entire apparatus is installed on an electric locomotive or a ship.

Instead of the short section of colored liquid 18, any other index may be provided to show the movement of the liquid column in response to changes in specific gravity.

It will be noted that the walls of the bells are imperforate to oppose escape of gas over the complete range of level.

It will be obvious to those skilled in the art that modifications may be made in details of construction and in matters of mere form without departing from the spirit of the invention.

I claim:

1. In apparatus for indicating the specific gravity of a liquid, the combination of two hollow vessels immersed in the liquid at different levels, each vessel having an opening in the bottom thereof and partially filled through said opening by said liquid but closed to the liquid above said opening, a specific gravity indicating device comprising two hollow bulbs located at different levels and connected at their lower ends by an indicating tube, transparent over at least a part of its length and of smaller internal cross-section than that of the bulbs, a pressure tube connecting the space above the liquid in the uppermost vessel with the upper space in the uppermost bulb, another pressure tube connecting the space above the liquid in the lowermost vessel with the upper space in the lowermost bulb, a liquid filling the indicating tube and the lower spaces of the two bulbs of which a section is of a different color from the rest and is located in a transparent portion of the indicating tube, and gas filling the pressure tubes and the upper spaces in the vessels and the bulbs but insufficient in volume to displace the liquid rising into the lower spaces of the vessels.

2. In apparatus for indicating the specific gravity of a liquid, the combination of two hollow vessels immersed in the liquid at different levels, each open below to give access to the liquid but closed to the liquid above, a specific gravity indicating device comprising two hollow bulbs located at different levels and connected at their lower ends by an indicating tube, transparent over at least a part of its length and of smaller internal cross-section than that of the bulbs, a pressure tube connecting the upper space in the uppermost vessel with the upper space in the uppermost bulb, another pressure tube connecting the upper space in the lowermost vessel with the upper space in the lowermost bulb, a liquid filling the indicating tube and the lower spaces of the two bulbs of which a section is of a different color from the rest and is located in a transparent portion of the indicating tube, and gas filling the pressure tubes and the upper spaces in the vessels and the bulbs, the height of the gas-filled space in the lowermost vessel being substantially greater than that in the uppermost vessel whereby compensation for the effects of changes of temperature of the first-mentioned liquid on its specific gravity is effected.

3. Apparatus for indicating the specific gravity of a liquid comprising an inverted cup shaped vessel adapted to be immersed in the upper portion of a quantity of liquid the specific gravity of which is to be indicated, a second inverted cup shaped member having a height greater than said first cup shaped member adapted to be immersed in the lower portion of a said quantity of liquid, each of said cup shaped members having an opening at the lower end thereof whereby said vessels are partially filled through said opening by said liquid, a differential pressure indicating device, pressure tubes connecting the spaces above the liquid level in each of said members with said indicating device, and a gas filling the pressure tubes and the spaces above the liquid in each of said members but insufficient in volume to displace the liquid rising in the lower portions thereof, said difference in height between said lower and upper members providing for gas spaces having substantially different heights thereby providing means for compensating for the effects of changes in the temperature of said quantity of liquid on its specific gravity.

JOSEPH LESTER WOODBRIDGE.